United States Patent
Gatherer et al.

(10) Patent No.: US 6,366,555 B1
(45) Date of Patent: Apr. 2, 2002

(54) METHOD AND DEVICE FOR CONTROLLING SIGNAL CLIPPING IN A DISCRETE MULTI-TONE COMMUNICATIONS SYSTEM

(75) Inventors: Alan Gatherer; Michael Oliver Polley, both of Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/083,794

(22) Filed: May 22, 1998

Related U.S. Application Data
(60) Provisional application No. 60/073,485, filed on Feb. 3, 1998.

(51) Int. Cl.[7] .................................................. H04J 11/00
(52) U.S. Cl. ........................................................ 370/210
(58) Field of Search ................................. 375/254, 222, 375/229, 231, 260, 285, 377, 224, 227, 240, 264, 130, 237, 238, 239, 242, 261, 275, 328; 370/468, 503, 210, 465, 241, 206, 207, 208, 209, 211, 212, 215, 535, 537, 344, 480, 481, 482, 484, 485

(56) References Cited

U.S. PATENT DOCUMENTS

| 6,005,893 A | * | 12/1999 | Hyll ............................. 375/260 |
| 6,021,167 A | * | 2/2000 | Wu ............................... 375/354 |
| 6,044,107 A | * | 3/2000 | Gatherer et al. ............. 375/222 |

* cited by examiner

*Primary Examiner*—Dang Ton
(74) *Attorney, Agent, or Firm*—J. Dennis Moore; W. James Brady, III; Frederick J. Telecky, Jr.

(57) ABSTRACT

A method of controlling the transmission amplitude of signals in a DMT communications system limited by a predefined dynamic range is disclosed. A block of bits is converted to a set of M constellation points in the fourier domain. The M constellation points are then mapped to a set of N complex points, wherein M is less than N, the N complex fitting within transmission subspace of the dynamic range of the system.

26 Claims, 5 Drawing Sheets

METHOD AND DEVICE FOR CONTROLLING SIGNAL CLIPPING IN A DISCRETE MULTI-TONE COMMUNICATIONS SYSTEM

This application claims priority under 35 USC 119(e)(1) of provisional application Ser. No. 60/073,485 filed Feb. 3, 1998, the entirety of which is incorporated herein by reference.

TECHNICAL FIELD

The invention relates generally to digital information transmission systems and specifically to techniques for controlling signal clipping over a discrete multi-tone communications channel.

BACKGROUND OF THE INVENTION

Discrete Multi-Tone (DMT) systems partition the available transmission bandwidth into many narrowband sub-channels over which parallel data streams are transmitted. For example, in one such communications system, a DMT symbol is created by summing several signals that are modulated (e.g. Quadrature Amplitude Modulation (QAM) to different frequencies called the tones of the signal. Summing many random signals leads to a transmitted signal whose probability density function is close to Gaussian and has a much higher Peak to Average power Ratio (PAR) than most single-carrier modulated signals.

The high PAR commonly employed in a DMT system can cause clipping of the transmission signal and loss of data. A Digital to Analog Conversion (DAC) circuit can be chosen to provide significantly high resolution in an attempt to limit the effects of clipping as well as distortion at the Analog Front End (AFE) which forms the interface to the network line. The AFE must have a larger dynamic range than the signal spectrum from the output of the DAC. This is a significant disadvantage for DMT when compared to single-carrier modulation because both the DAC and AFE can become a significant percentage of the cost of the transmitter/receiver. In addition, the AFE can become the greatest power consuming element of the system.

To reduce AFE complexity and power consumption, DMT transmitters are often designed to support lower PAR values. However, this savings in complexity often causes clipping of the DMT signal, which can reduce performance. A DMT signal has a much higher peak to average ratio than a comparable single tone modulation signal. Therefore a DMT transmitter has to either have a significantly more expensive AFE both in terms of the analog filter and line drivers to effectively control the amount of clipping.

Prior methods of reducing the complexity and costs of the AFE and DAC in a DMT system include modifying the transmitted signal to reduce the amount of clipping. For example, a prior method uses signal processing in the transmitter to reduce the effect of clipping at the front end of the transmission while the decoding operations in the receiver remain unchanged. Another prior method applies signal processing algorithms in the transmitter, but depends on the receiver to recognize that clipping control has been applied to perform appropriate inverse operations.

An example of these prior methods is the spectral shaping technique described in "Mitigating Clipping Noise in Multicarrier Systems", by J. S. Chow, J. A. C. Bingham and M. S. Flowers, 1997 IEEE International Conference on Communications. When the transmitter detects a clip it adds more "noise" to the signal to modify the spectrum of the clip and push more energy into the higher frequencies. The clip, in turn, appears as an impulse which is white noise in that part of the spectrum. In theory, as the SNR is dropping towards higher frequencies, the spectrally shaped clipping noise will have little effect on the total SNR of the signal. This method, however, has the disadvantages that the total clipping noise is increased and no attempt is made in the receiver to cancel this noise. Thus, the receiver decodes the signal in the same way whether the shaped clipping noise is present or not.

Other prior methods of dealing with signal clipping decrease the size of the input data block so it is smaller than the DMT block size. The transmitter performs a one-to-one map of the data to a subset of possible DMT blocks that are known to have good PAR values. The complexity of the mapping routines, however, makes such a technique unfeasible for many applications except for those using very small block sizes (e.g. 4 tones) since there is no straight forward way to achieve mapping in more complicated systems. Additionally, such mapping techniques often result in a significant reduction of data rate.

Another prior method of dealing with clipping includes the setting aside of tones for the transmission of information describing the actions of the transmitter. An example of such a technique is also described in the article "Mitigating Clipping Noise in Multicarrier Systems" wherein the transmitted signal is scaled down by a factor and if clipping occurs a reserved tone is used to communicate the scaling factor to the receiver. Incorrect decoding of the reserved tone, however, will lead to incorrect decoding of the whole block, so the reserved tone is a high SNR tone that is carrying only a few bits of information.

Still another method of dealing with clipping problems is disclosed in the article "A Method to Reduce the Probability of Clipping in DMT-Based Transceivers" by D. J. G. Mestdagh, P. M. P. Spruyt, IEEE Trans. On Communications, Vol. 44, No. 10, Oct. 1996, pp 1234–1238, which describes a method wherein a known random phase sequence is added to the phase of the transmitted signal if clipping occurs. For this to work, however, one must assume the probability of both the original signal being clipped and the original signal plus random phase being clipped is much less than the probability for the original signal alone being clipped. Again, a high SNR tone is used to signal that a random signal has been added.

With the development of high speed digital subscriber lines and components supporting such lines, a premium is placed on effective and reliable data high rate throughput. For example, modems supporting DMT transmissions must be able to work within the constraints of the transmission standard. With asymmetric digital subscriber line (ADSL) signaling, the modem or transceiver must be able to support a large amount of digital and analog signal processing to achieve the data throughput rates called for by the ADSL standard. Until the present invention, however, the problem of signal clipping and the desire to limit the expense in the modem made widespread deployment unfeasible especially for the home or small business user. As such, a method of controlling clipping in the transmitted signal without using a sophisticated AFE or DAC required by prior techniques is needed.

SUMMARY OF THE INVENTION

Accordingly, the present invention relates to techniques for clipping control ideal for use on any discrete multi-tone (DMT) transmission system such as asymmetric digital subscriber line (ADSL) or Orthogonal Frequency Division Multiplexing System (OFDM) such as for terrestriol broadcast in wireless transmission.

In one embodiment, a method of controlling the transmission amplitude of signals in a DMT communications system limited by a predefined dynamic range is disclosed. The method comprises the steps of converting a block of bits into a set of M constellation points in the fourier domain; and transforming the M constellation points into N complex points, wherein M is less than N, each of the N complex points falling within the transmission subspace within said predefined dynamic range.

The method can also include a mapping function that associates each M value to an N value whose real inverse fourier transform is within the predefined dynamic range. In one embodiment, the mapping function is an iterative process that starts at an initial guess of a point within the N dimensional array defined by the N complex points and converges to a solution who real inverse fourier transform is within said predefined dynamic range.

In another embodiment, the method further comprises the step of transforming the M constellation points into N complex points by the steps of: performing a one-to-one mapping of the M constellation points to the N complex points; adding an initial estimate of a displacement vector (B) to the N complex points to obtain the sum N+B; performing a real inverse fourier transform of the sum N+B; and testing the real inverse fourier transform of the sum N+B to determine if it within said predefined dynamic range.

According to another embodiment, a method of minimizing the loss of data due to signal clipping in a discrete multi-tone (DMT) communications system by transmitting signals within a predefined transmission subspace is disclosed. The method comprising the steps of mapping a data point to a specific point within a first subspace; choosing an offset point from a subspace that is orthogonal to the first subspace; and adding the vector equivalent of the offset point to the vector equivalent of the specific point within first subspace to obtain a vector sum within the predefined transmission subspace.

BRIEF DESCRIPTION OF THE DRAWINGS

Other aspects of the invention including specific implementations are understood by reference to the following detailed description taken in conjunction with the appended drawings in which.

References in the figures correspond to like numerals in the detailed description unless otherwise indicated.

DETAILED DESCRIPTION OF THE PREFERRED EMBODIMENTS

The invention can be implemented in both software and hardware and has application in a digital communications system wherein high data throughput is achieved by multiplexing the available bandwidth into multiple channels across a single medium. An example of such a system is an asymmetric digital subscriber line (ADSL) although other multi-tone systems can benefit from the invention as well.

Figure 1:
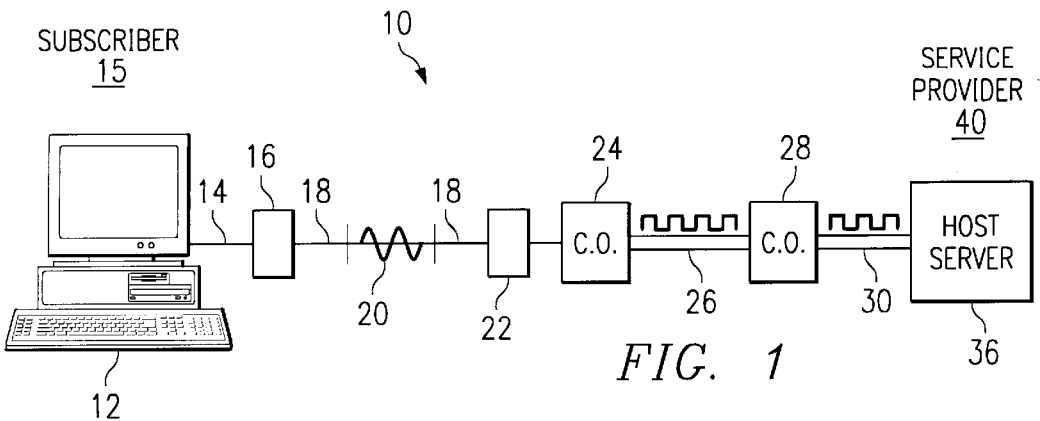
FIG. 1 is a diagram illustrating a communications system wherein the invention can be practiced.

FIG. 1 illustrates an example communications system 10 in which the invention can be practiced according to one embodiment. The communications system 10 includes a service provider 40 that is accessible by a subscriber 15. Generally, the subscriber 15 has the transmission/reception and data processing equipment enabling access to the service provider 40.

As shown, a first processing system 12 is operably coupled to a first modem 16 via interface 14. The interface 14 provides a communications pathway for unmodulated data transfers between the first modem 16 and the first processing system 12. Alternatively, the first modem 16 could be internally fixed inside the first processing system 12 and coupled through a standard interface of the first processing system 12. Example interface standards employed between the modem 16 and the first processing system 12 include EISA, PCMCIA, RS-232 and other industry accepted interface protocols.

In operation the first processing system 12 communicates digitally with the first modem 16. Data from the first processing system 12 is transferred through the interface 14 and maintained in a buffering mechanism such as an internal memory space (ROM or RAM) or other similar memory configuration inside the first modem 16. In many applications, a universal asynchronous receiver transmitter (UART) or other similar device is used to handle data flow between the first processing system 12 and the modem 16.

The first processing system 12 can be a desktop or notebook computer, workstation or other similar computing device. The first modem 16 includes a signal processing device for converting digital data from the processing system 12 to an equivalent modulated analog waveform. The modem also includes an interface such as an analog front end (AFE) which couples the analog signals carrying the data to the communications link 18 to the central office 24.

Typically, the transmit and receive functions of the modem 16 are operated by the processing system 12. A digital-to-analog/analog-to-digital conversion circuit or other similar signal processing device can be used to transmit and receive analog signals via the communications link 18. The communications link 18 can be analog twisted pair (ATP) wiring or other medium of the type often used in public switched telephone networks (PSTN).

The digital data from the processing system 12 is converted to analog equivalent signals which are transmitted on the ATP wiring 18 using known modulation methods. Examples of such modulation methods include Quadrature Amplitude Modulation (QAM), Trellis Code Encoding (TCE) and Frequency Shift Keying (FSK) among others. Likewise, the service provider 40 receives the signals from the far end central office 28 the digital backbone connection 30. The data is passed to the second processing system 36 at the service provider location 40. A similar function is provided for the transmission of signals from the service provider 40 to the subscriber 15. The processing system 36 is employed by the service provider 40 to gain access to the central office 28 and to format, receive and transmit data to other entities such as subscriber 15. Preferably, both processing systems 12 and 36 contain the necessary processing and storage capabilities and run suitable application programs for such functions.

As described herein, the invention has particular application in a DMT-compliant signaling system with a pair of ADSL modems communicating over a network 10. In one embodiment, an ADSL modem 16 on the subscriber side 15 communicates with another ADSL modem 22 maintained by the central office 24. With such a configuration, multiple transmission channels can be maintained according to one embodiment: a high speed downstream channel, a medium speed duplex channel, and a Plain Old Telephone Service (POTS) channel. The POTS channel can be split off from the ADSL modem by filters, thus guaranteeing uninterrupted POTS, even if ADSL fails. The high speed channel ranges from 1.5 to 6.1 Mbps, while duplex rates range from 16 to 640 kbps. Each channel can be submultiplexed to form multiple lower rate channels. Still other data rates may be employed as may be standardized in the industry.

Downstream data rates depend on a number of factors, including the length of the copper line, its wire gauge, presence of bridged taps, and cross-coupled interference. Line attenuation increases with line length and frequency, and decreases as wire diameter increases.

Preferably, the communications system 10 supports both downstream and upstream communications. Typically, when a subscriber 15 wishes to place a call, the modems 16 and 22 send probing tones via the analog line 18. The central office 24 comprises the call switching and routing equipment necessary to complete a path between the subscriber 15 and the service provider 40.

The functionality of the subscriber 15 and the service provider 40 can be implemented using known methods and devices. For example, the signaling protocols used by the various devices on the system 10 may include those supported by the International Standard Organization (ISO), the International Telegraph and Telephone Consultative Committee (CCITT) and the Electronics Industries Association (EIA) among other standards bodies.

Once a call is established, data from the first processing system 12 is passed to the first modem 16, modified appropriately with signal processing techniques to prepare the data for robust transmission, and converted using a digital to analog convertor or other similar conversion device. Next the modem 16 transmits the converted digital stream using a modulated analog signal carrier 20 over analog twisted pair 18 to the central office 24. At the central office, another DSL modem 22 decodes the data and ports it to the digital backbone network 26. The digital backbone network 26 connects the central offices 24 and 28. The central office 28 receives the digital data from the backbone 26 and port it on the digital link 30 the service provider's processing platform 36.

As shown, the near end central office 24 communicates with the far end central office 28 via the digital backbone network 26 which is often a high speed digital communication channel providing a high data rate. The analog signals 18 are received by the second modem 22 and demodulated to obtain the original data sequence generated by the first processing system 12. The second modem 22 passes the digital bit stream sequence to the digital backbone network 26 and on the far end central office 28. Thus, processing systems 12 and 36 communicate with each other through communications facilities comprised of communications mediums 16,18,22,24,26,28 and 30. The service provider 40 can be an Internet service provider or dedicated data service provider of the type available in industry. The modems 16 and 22 comprise the data communication equipment (DCE) responsible for providing the required translation and interface between the digital and analog signals carried on the system 10.

Preferably, the modems 16 and 22 are designed to transmit and receive analog signals tuned to one or more analog carrier frequencies. The data from the processing systems 12 is superimposed upon one or more analog carrier frequencies and transmitted on the system 10. The analog carrier frequencies are often referred to as the base band signals and are represented in FIG. 1 by the waveform 20. The waveform 20 is changed back to the digital signal at the receiving modem 22 through the process of demodulation. In essence the modems 16 and 22 provide the transmit and receive functions for the binary bits of digital data generated by the processing system 12 at the subscriber location 15.

Figure 2:
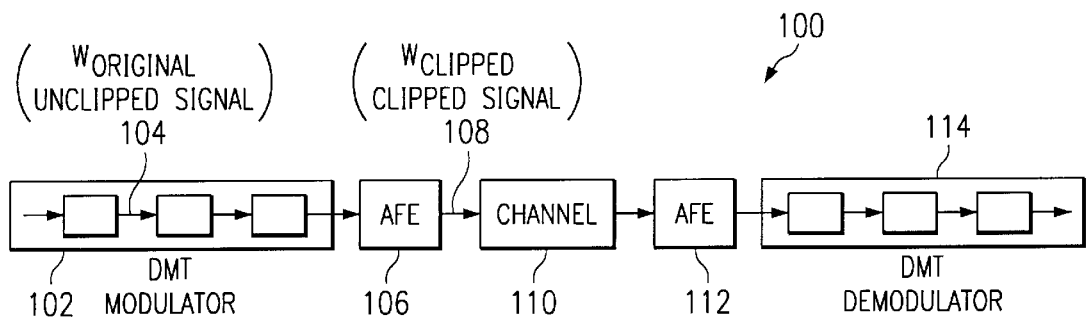
FIG. 2 is a block diagram of a DMT modulator/demodulator system illustrating the clipping phenomenon.

Turning to FIG. 2, a block diagram of a DMT transmission sequence 100 illustrating the clipping phenomenon to which the invention is directed is shown. The transmission sequence 100 begins at the DMT modulator 102 which generates an unclipped modulated signal ($W_{original}$) using known modulation techniques. The unclipped signal 104 is forced into the AFE 106 which forms the interface to the communications channel 110.

As shown, the output from the AFE 106 is a clipped signal ($W_{clipped}$) 108 which results from the limited dynamic range of the AFE 106 which cuts the original unclipped signal 104 ($W_{original}$) at the rails of the system. Note that any other type of distortion can be outside the dynamic range of the AFE 106 and the methods of the present invention can be applied equally to such other sources of distortion.

Figure 3A:
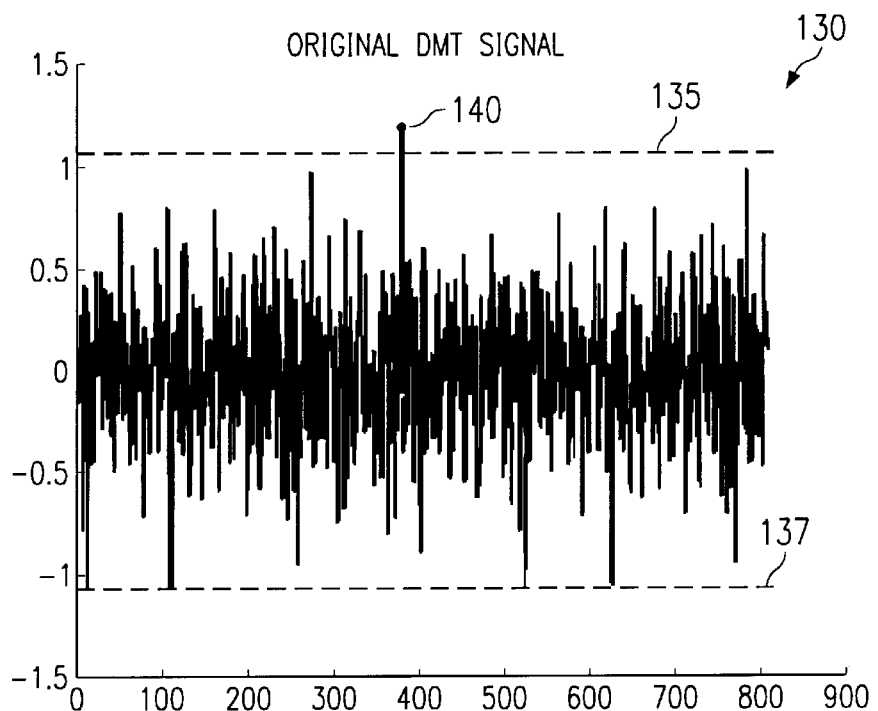
FIGS. 3a and 3b show a frame of data before and after clipping.
Figure 3B:
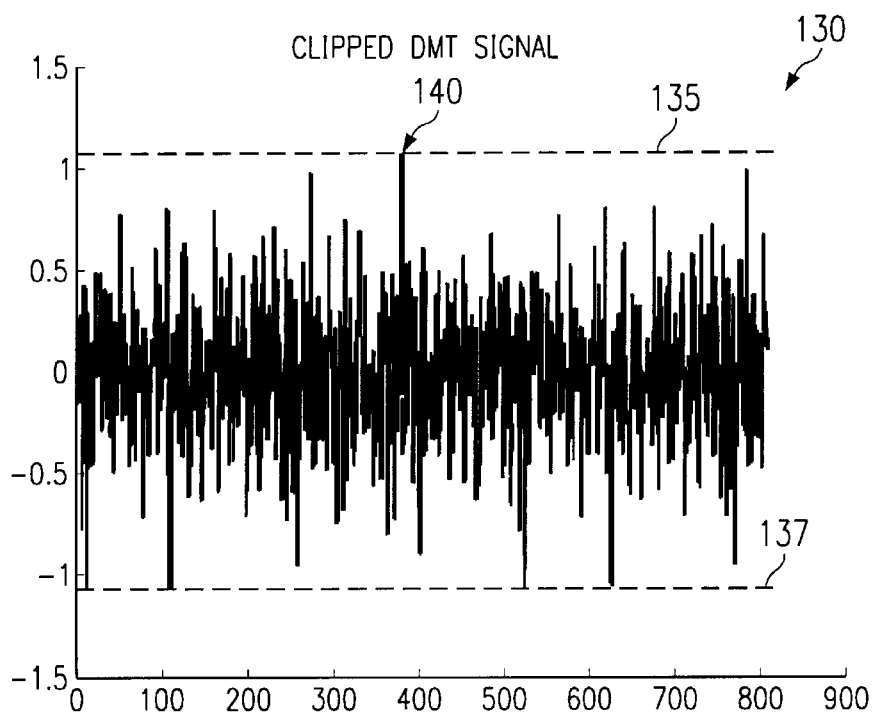

FIG. 3a shows a frame of data 130 generated by a typical ADSL DMT transmitter 102. The dashed lines 135 and 137 represent the maximum amplitude levels or rails supported in the transmitter. A sample point 140 exceeds the maximum allowable signal level between the lines 135 and 137 for a given system. The same frame of data is shown in FIG. 3b after signal clipping in the AFE 106 wherein the new largest value is shown as fitting within the rails 135 and 137. In practice the AFE 106 is built into the transmitter of the modem 16 and 22. As illustrated more fully in FIG. 4, there are various locations in the transmitter where signal clipping of this type can occur.

In reference to FIG. 2, the clipped signal 108 is transmitted on the communications channel 110 which is often a twisted pair connection to a central office facility.

The far end AFE 112 receives the clipped signal 108 as reduced by any transmission losses and passes it to the DMT demodulator 114 which, in turn, demodulates the analog signal and converts it to its digital bit stream equivalent. In practice, the DMT modulator 102 and demodulator 114 devices are often contained inside the modem 16 and 22. Typically, the modems 16 and 22 include the line interfaces, transformers, analog filters, and A/D converters required to interface to the channel 110 and are capable of compensating for attenuations which occur over long telephone lines near one megahertz, e.g. at the outer edge of the ADSL band, by forcing the AFEs 106 and 112 to support relatively large dynamic ranges maintaining sufficiently low noise figures.

Thus, the invention can be practiced in a modem containing the transmission and reception functions according to the methods herein disclosed. Such a modem can be implemented as any suitable device capable of transmitting and receiving signals over the PSTN. More specifically, the processing system 12 may operate such a modem according to the present invention to transmit downstream at a particular range of frequencies or tones within a DMT band. Likewise, a second modem according to the invention should be capable of receiving signals over an upstream tone or range of tones, each within the bandwidth of the defined downstream frequencies.

Each such modem may also utilize a common control or out of bound channel to convey overhead information, such as a probing signal or other handshake and call progress information as well a signal to noise levels for each transmission subchannel in the channel 110. In one embodiment, the overhead information is negotiated on a low bandwidth channel prior to call setup.

Each such modem may be installed, maintained, and/or operated at an individual customer's premises, such premises being either commercial or residential or at the service provider location. Multiple modems may be utilized by the service provider 40 in the form of a modem rack supporting multiple concurrent calls from a plurality of subscribers 15. Each modem may be coupled to one or more telephones with a hardwired connection or a splitter. In other embodiments, a splitterless solution may be employed over the same twisted pair circuit.

Generally, in operation, an ADSL modem according to the present invention modulates a digital bit stream sequence received from the processing system 12 by converting the stream into its analog equivalent and applying the modulation rules that apply to the signaling protocol in use. Examples of such modulation schemes are those that derive from well known modulation techniques such a PSK, QAM, and TCE among others. The modulation waveform constitutes a constellation pattern which is enclosed in a carrier waveform of the unclipped waveform 104. The waveform 104, in turn, is transmitted on the channel 110 through AFE 106 to other network elements.

Figure 4:
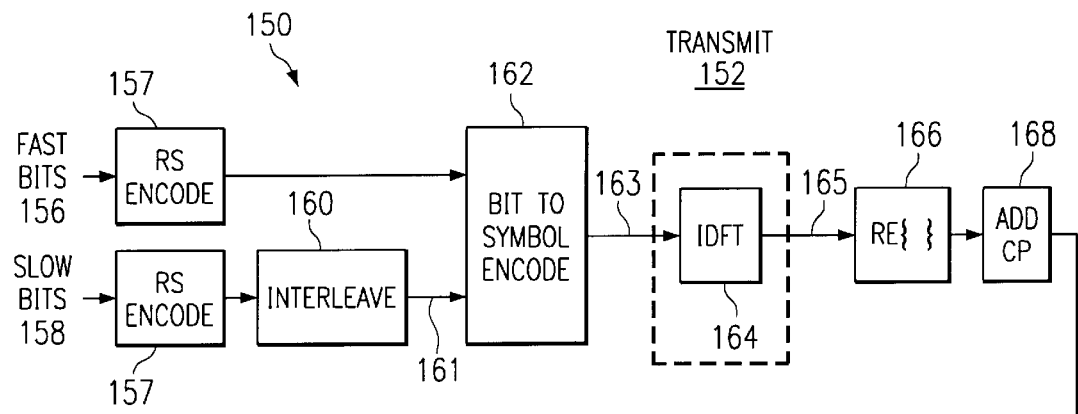
FIG. 4 is a block diagram showing transmission sequence in a DMT communications system.
Figure 4:
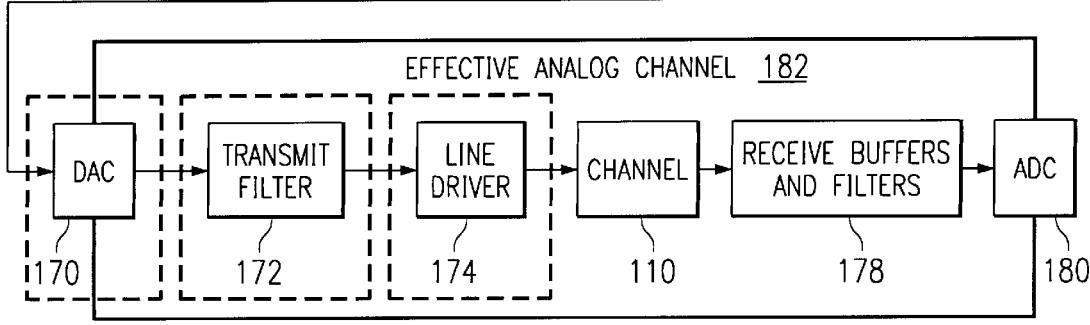
Figure 5:
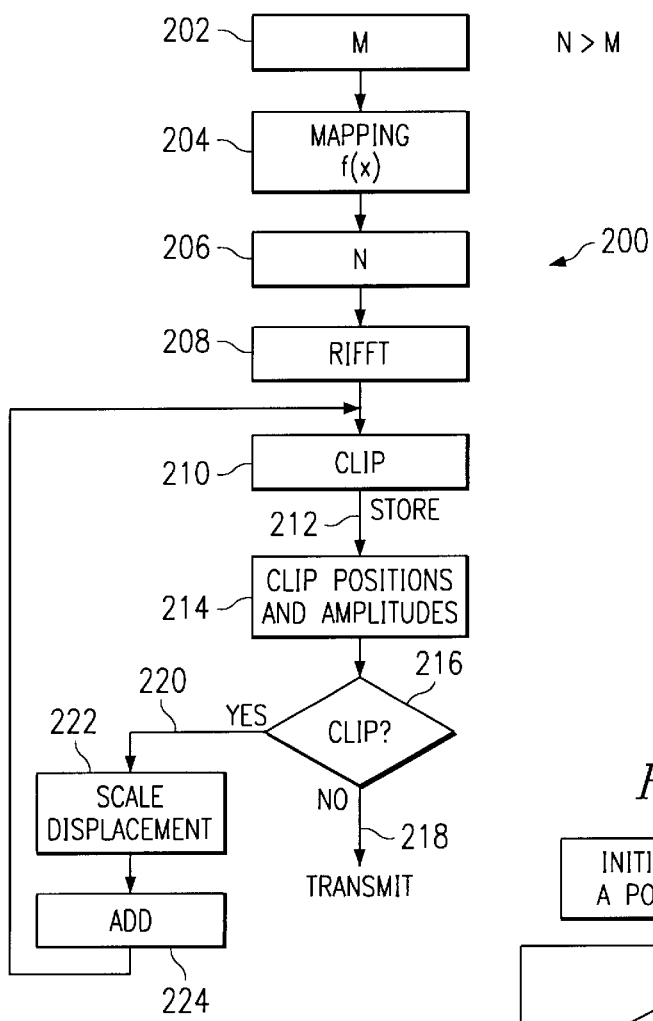
FIG. 5 illustrates a method for mitigating signal clipping according to one embodiment.

In FIG. 4, a process flow diagram illustrating the functions required for transmission of data from one Discrete Multi-Tone (DMT) modem to another is shown and denoted generally as 150. Preferably, the functions are implemented on a pair of T1.413 compliant ADSL modems. Typically, each modem implements both transmit and receive functions, although FIG. 5 illustrates the transmit functions 152 only.

As shown, the transmit functions 152 extend in one direction although an actual bi-directional ADSL communications link between modems extends in both directions. At block 157, Reed-Solomon (RS) forward error-correction encoding is applied to both fast bits 156 and slow bits 158 in the transmitter. Preferably, the RS-encoded slow bits are interleaved, block 160, to provide extra resistance to clipping and channel error. Thus, performance is improved at the expense of additional encoding delay.

Next, the output of block 157 is combined with the RS-encoded and interleaved slow bits 161 in a frame of bits that is converted into a frame of two-dimensional transmission symbols at block 162. Preferably, the transmission signals represent information in a form that is conducive to robust transmission over an ADSL communications link. In one embodiment, the Inverse Discrete Fourier Transform (IDFT) is applied at block 164 to the frame of transmission symbols 163 after appropriate conjugate mirroring of the frame according to the T1.413 standard.

The conjugate symmetry enforced on the IDFT input 163 causes the output to be completely real. As shown in FIG. 4, the REAL{} operator at block 166 indicates that the imaginary component of the IDFT output 165 is not used. Next a cyclic prefix is created from the last samples of the frame of real data and concatenated at block 168 to the beginning of the frame. Thus, the resulting frame of data is passed through a Digital-to-Analog Converter (DAC) 170 and then to a transmit filter 172 that provides the low-pass and high-pass filtering functions. The filtering functions are required to ensure the transmitted signal does not exceed the T1.413 power spectral density mask.

A line driver circuit can be used at block 174 to provide the current and/or voltage gains required to place the filtered signal onto an ADSL format with the appropriate power level. After transmission through the channel 110, the signal passes through receive buffers and filters at block 178 and into the Analog-to-Digital Converter (ADC) at block 180. The effective analog channel 182 seen by the transmission system is formed by the analog portion of the DAC 170, the transmit filters 172, the line driver 174, the actual DSL channel 110, the receive buffers and filters 178, and the analog portion of the ADC 180.

It has been shown that the most probable locations for the occurrence of clipping, as indicated by the dashed lines, is around the IDFT function 164, the DAC function 170, the transmit function 172 and the line driver function 174. DMT is a block based system and, as such, the methods of the present invention relate to preventing clipping in a single block. The cyclic prefix and block 168 is a repetition of a section of the block.

Preferably, the magnitude of all elements of a signal vector having length "N" is kept below the clip magnitude "C." Without clipping control the signal vector is as shown in equation 1:

$$x = F \cdot X \quad (1)$$

where X is a length N vector of constellation points and F is the inverse fourier transform matrix.

In order to control clipping, some loss of data rate is inevitable because the signal vector is constrained to lie in an N dimensional subspace. The subspace can be thought of as a "hypercube" centered about the origin with side length 2C.

Because the data is in the frequency domain but the hypercube is in the time domain, it is difficult to define a set of data signals that are guaranteed to lie within the hypercube. Even where a set of good signals in the time domain can be found, they are often mapped to the frequency domain via a table lookup. For DMT with 256 tones and large constellation sizes, the size of the table would be unacceptable.

Turning to FIG. 5, a process flow diagram of a method for controlling signal clipping in a DMT communications system according to the invention is shown and denoted generally as 200. The point vector M is obtained at step 20 and constrained to lie in a subspace N arrived at step 206 using the mapping function of step 204. The mapping function of step 204 can be defined so that the columns of the matrix Sx with M<N are such that for any point X the condition in equation (2) satisfied:

$$X = Sx \cdot A \text{ for some length M vector} \quad (2)$$

where Sx can represent the subspace generated by the matrix Sx. M is chosen to suit the required data rate so that data is represented by the length M vector A. Sx can still be anything provided it is full rank. The transmit vector can now be X+B provided the receiver can separate B and X.

According to one embodiment, B is constrained to be in the subspace $S_B$ which is orthogonal to Sx. The transmitted vector is in the subspace $S_T$ formed by offsetting $S_B$ by X. Preferably, B is chosen so that its time domain equivalent (x+b) is within the clipping hypercube. Thus, both $S_B$ and the clipping hypercube are convex and it is a matter of finding a point in the transmitter that is the intersection of two convex sets.

The formation of the transmit vector $S_T$ is accomplished by applying the Real IFFT (RIFFT) function at step 208 to the subspace N. Next, the signal is clipped at step 210 at the rails of the DMT system and stored, step 212, for further processing. The amplitudes and positions for clips is determined at step 214. If no clip is found in a particular frame, then the original signal is transmitted, step 218. Otherwise, the signal is not transmitted, step 220, and a displacement vector is added at step 224 whose value is determined completely by the values of the position and amplitudes of the clips as determined at step 214. At this point, steps 210, 212, 214, 216, 218 and 220 are repeated as appropriate.

Figure 6:
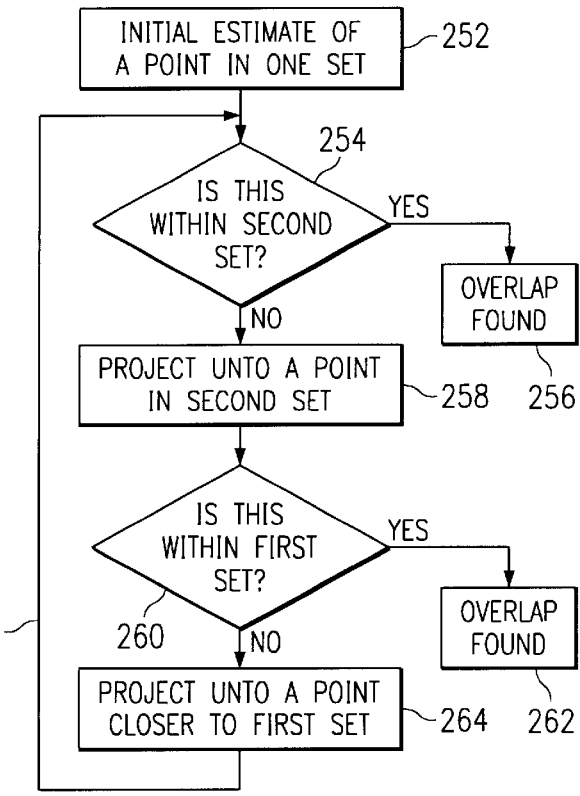
FIG. 6 is a process flow diagram of a method for projecting unto convex sets that can be used to find a point of overlap of two convex subspaces.

The displacement vector and the hypercube form two convex set of points in space with their intersection forming a third set of points which can be transmitted without clipping. As is known to those of ordinary skill, many algorithms exists for finding the intersection between two convex sets. According to one embodiment, one such method is projection onto convex sets (POCS). FIG. 6 illustrates the POCS method 250 that permits the finding of a point in two overlapping convex sets.

In general the POCS method 250 starts by making an initial estimate at step 252 of a point in a first set. Next, it is determined if this point is within the second set, step 254. If so, then the overlap has been found, step 256. If not, then further projections are made to refine the initial estimate made at step 252.

A projection is made onto a point in the second set, step 258. Next, it is determined if this point in the second set is also within the first set at step 260. If so, then a point of overlap between the two sets has been found, step 262. If not, then a further projection is made, step 264, unto a point in the first set. The sequence is repeated, arrow 266, in this manner with each repetition refining the estimate by projecting to points closer to the overlapping sets.

Figure 7:
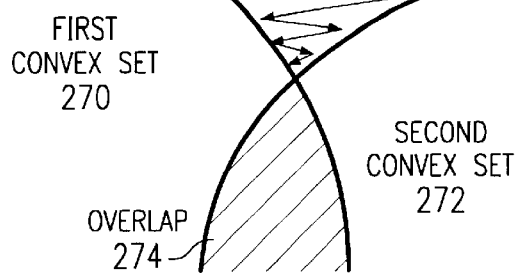
FIG. 7 illustrates the overlap between two convex sets and convergence using the method of FIG. 6.

Method 250 is guaranteed to find a point in the overlap of the two subspaces if an overlap exists. Convergence unto the overlapping set of points is illustrated in FIG. 7 wherein the multiple arrows bouncing back and forth between the two sets 270 and 272 converge unto points within the overlapping set 274.

For clipping control according to one embodiment, one of the two subspaces 270 and 272 can be the set of all points within the clipping hypercube which is projected onto by clipping the original modulated signal. The other subspace is transmission subspace $S_T$ and hence the complexity of the algorithm depends on the complexity required to project the hypercube onto the transmission subspace $S_T$ and the speed of convergence of the iterative method 250 employed.

In ADSL, the DMT signal rarely uses all of the bandwidth and often the top portion of the available bandwidth carries little or no data. Thus, after bit allocation there will be a set of tones that carry no data because of insufficient SNR in certain DMT subchannels. These unused set of tones correspond to a set of elements in the data vector that carry no data. According to one embodiment, the space of all vectors whose elements in the unused set are used to transmit the data. Thus, the unused set can be used to mitigate the clip without changing the data. The effective data rate remains the same although clipping can be controlled effectively.

Starting with a point in Sx, a vector B is found from the space of vectors that are only nonzero in the unused set such that time domain equivalent (x+b) is in the clipping hypercube. Projection onto $S_T$ from the time domain can be performed by an FFT followed by setting the used set back to their original values. This is followed by an IFFT.

The complexity of this algorithm can be reduced by noting that the signal vector Sx has nearly independent Gaussian elements and therefore it is very improbable there will be more than one or two clips in any single vector. Thus, in one embodiment, each clip is considered independently and the effect of all clips in the transmitted signal are combined linearly to get the overall effect.

Figure 8:
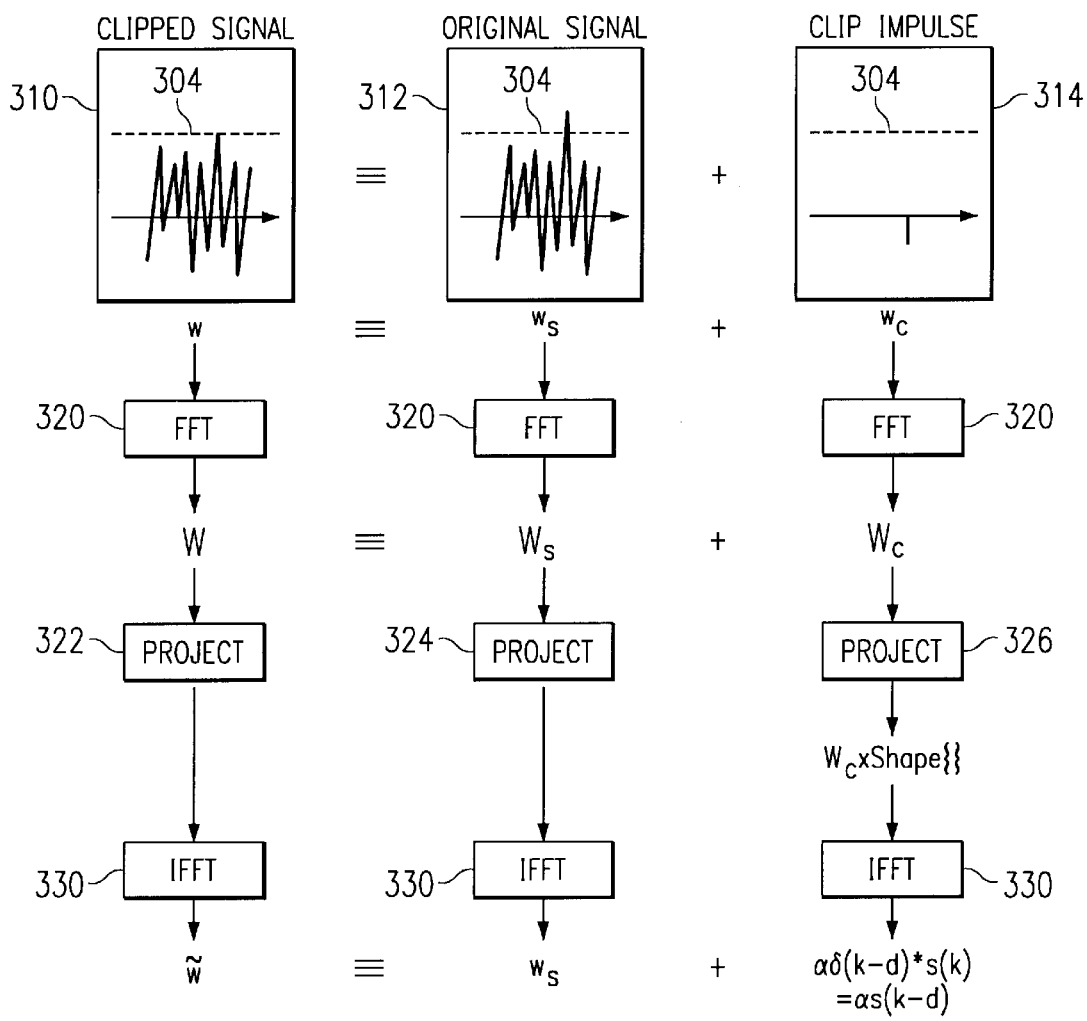
FIG. 8 is a process flow diagram of method controlling clipping in a DMT communications system according to one embodiment.

This projection algorithm is illustrated in FIG. 8 and denoted generally as 300. The effect of one clip is an impulse 314 at the point of clip which has clipping amplitude equal to the amount the signal that is over or under the clip level 304. To show how the POCS method 250 can be simplified, the clipped signal vector 310 is decomposed into the original signal 312 and the clip impulse 314. An FFT operation is performed, step 320, on the sum. Alternatively, due to the linearity of the FFT operation, it is also possible to perform the FFT operation, step 320, on each part of this sum (Ws+Wc) separately.

Next, projecting W into the subspace $S_T$, step 322, is equivalent to setting the used elements back to their original values at step 322 which, in turn, is equivalent to doing nothing at step 324 and setting all the used elements to zero at step 326. Moreover, setting all the used elements to zero is equivalent to multiplying the FFT of the clip by a binary function which is zero in the used set and one in the unused set. The IFFT of the binary function can be thought of as a shaping function (shape{}).

Because of the linearity of the IFFT operation, step 330, it is possible to delay summing until after the IFFT. If so, the IFFT operation can be performed separately on the original vector and the modified clip vector. The IFFT of the multiplication of the original clip by the shaping function (shape {}) produces a circular convolution of the shaping function (shape {}) with the original clip impulse 314. Therefore, the effect of each clip is to add to the original vector 312, the shaping function (shape {}), scaled by the clip amplitude 314, and circularly shifted to the point of the clip. When a clip is found, no addition is done until all other clips are found as any change in the vector will effect the clip positions.

The projection algorithm 300 for a fourier subspace can be defined as the Fourier Projection Algorithm (FPA). The FPA can comprise the steps of performing an IFFT to get signal point; recording the position and amplitude of any clip that would occur if the signal point were clipped; if no clipping occurs return the signal point and terminate; if clipping does occur, to each signal point add the scaled shaping function (shape{}) and perform a circular shift so it is centered about the clipping position. Repeat the sequence.

Preferably, the FPA reduces the required clip level for a given performance. Performance can be defined in terms of the probability of signal corruption due to a particular clip level. In one embodiment, a Gaussian distribution of the peak value of a set of points is assumed. A Gaussian distribution is a good approximation for all cases. By extending the result for the cumulative distribution function (CDF) of the maximum of two random variables, the result in Equation 3 is obtained.

$$Pr(\max(|x_k|) < m) = (1 - 2l\, Q(m/\sigma_x))^{512} \quad (3)$$

Q(a) is the well known Q function that gives the probability of a Gaussian random variable of unit variance and zero mean being greater than is the standard deviation of the output samples. To derive this result, independence of the samples can be used and the symmetry of the Gaussian point distribution function. In one embodiment, 16QAM can be used (power equal to 10 for each tone) with a normalized IFFT operation.

The output standard deviation for the remaining 192 tones is indicated in Equation 4:

$$\sqrt{(192/256) \times 10/512} \quad (4)$$

Figure 9:
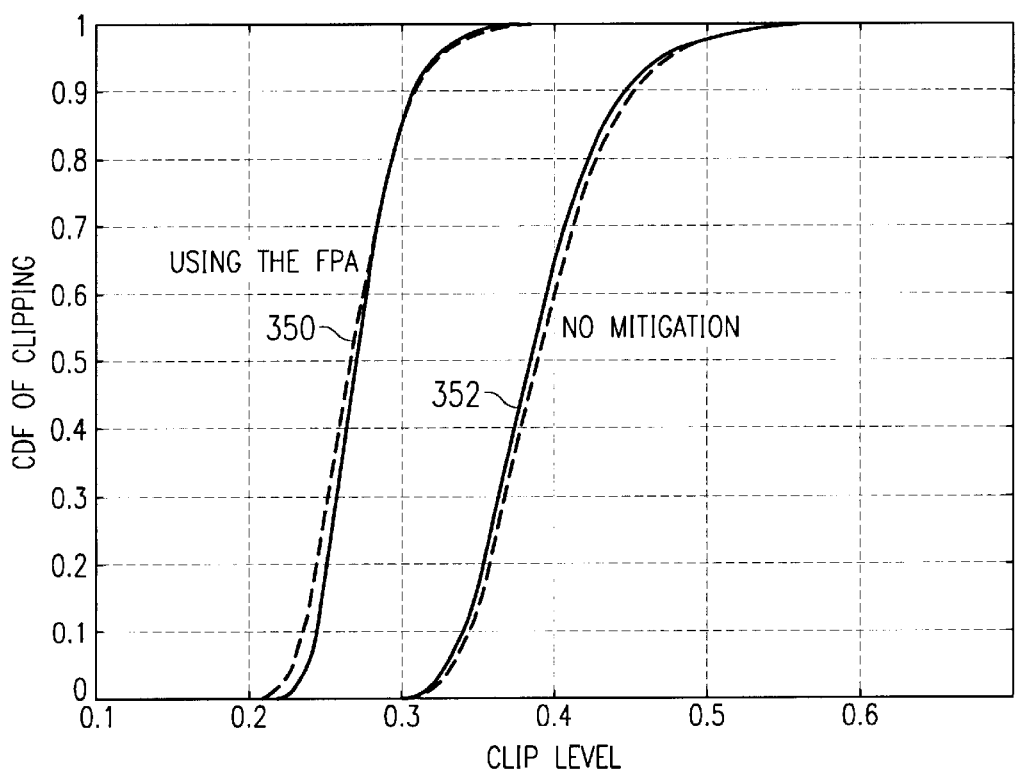
FIG. 9 illustrates the cumulative distribution function with and without clipping mitigation according to the invention.

The values generated by equation 4 can be plugged into Equation 3 and plotted to obtain the graph shown in FIG. 9 wherein the dotted line 350 is shown close to the experimental CDF line 352 for no mitigation. Typically, there is usually only one clip per vector. As such, according to one embodiment, the complexity of each iteration is limited to a test for clip, a multiply and an add per element per iteration.

Figure 10:
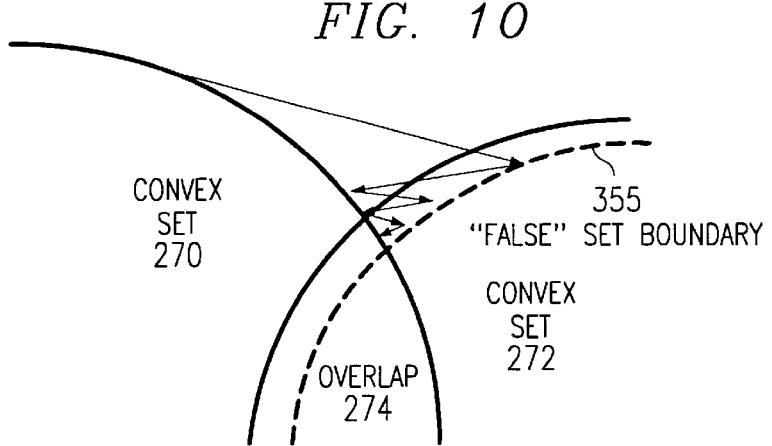
FIG. 10 illustrates the overlap of two convex sets using a false set boundary.

One problem with the POC method 250 is that its convergence slows down as the solution set is approached as shown by the converging arrows of FIG. 7. In one embodiment, the number of iterations is reduced by making the clipping hypercube smaller so that the algorithm projects onto a false set boundary that is actually inside the convex set. The false boundary 355 is illustrated in FIG. 10.

While the invention has been described in conjunction with preferred embodiments, it should be understood that modifications will become apparent to those of ordinary skill in the art and that such modifications are intended to be included within the scope of the invention and the following claims.

What is claimed is:

1. A method of transmitting data over a Discrete Multi-Tone (DMT) communications system having a dynamic range, comprising the steps of:
   converting the data into a set of M constellation points in a fourier domain; and
   transforming the M constellation points into N complex points, wherein M is less than N, said N complex points included within a set of points confined to the dynamic range of the communications system.

2. The method according to claim 1 wherein said step of transforming the M constellation points into N complex points includes a fourier transformation from a frequency domain to a time domain.

3. A method of transmitting data over a Discrete Multi-Tone (DMT) communications system having a dynamic range, comprising the steps of:
   converting the data into a set of M constellation points in a Fourier domain; and transforming the M constellation points into N complex points, wherein M is less than N, said N complex points included within a set of points confined to the dynamic range of the communications system,
   wherein said step of transforming the M constellation points into N complex points includes a mapping function that associates each M value to an N value whose real inverse Fourier transform is within the dynamic range of the system.

4. The method according to claim 3 wherein said mapping function is an iterative process that starts at an initial guess of one of said N complex points and converges to a solution whose real inverse fourier transform is within the dynamic range of the system.

5. The method according to claim 4 wherein said iterative process is performed using a projection algorithm.

6. The method according to claim 5 wherein said projection algorithm is projection onto convex sets.

7. A method of transmitting data over a Discrete Multi-Tone (DMT) communications system having a dynamic range, comprising the steps of:
   converting the data into a set of M constellation points in a Fourier domain; and
   transforming the M constellation points into N complex points, wherein M is less than N, said N complex points included within a set of points confined to the dynamic range of the communications system, wherein said step of transforming the M constellation points into N complex points includes the steps of:
   performing a one-to-one mapping of said M constellation points to said N complex points;
   adding an initial estimate of a displacement vector (B) to said N complex points to obtain a sum (N+B);
   performing a real inverse Fourier transform of said sum (N+B); and
   testing the real inverse Fourier transform of said sum (N+B) to determine if it is within said dynamic range.

8. The method according to claim 7 further comprising the step of transmitting the real inverse fourier transform of said sum (N+B) when it falls within the dynamic range of the system.

9. The method according to claim 7 further comprising the steps of:
   modifying the value of the displacement vector (B) when the real inverse fourier transform of the sum (N+B) falls outside said dynamic range; and
   adding a modified displacement vector to said N complex points to obtain a modified sum (N+B).

10. The method according to claim 7 wherein N complex points define an N dimensional array and wherein said one-to-one mapping step is performed by placing said M constellation points in specific locations of said N dimensional array, said specific locations constituting used points of said N dimensional array.

11. The method according to claim 10 further comprising the step of setting unused points in said N dimensional array to zero.

12. The method according to claim 10 further comprising the step of setting unused points in said N dimensional array to any non-zero constant.

13. The method according to claim 12 further comprising the step of constraining said displacement vector (B) to unused points of said N dimensional array.

14. The method according to claim 11 further comprising the steps of:
   transmitting said N dimensional array on said communications system;
   receiving said N dimensional array;
   reading the values stored in used points of said N dimensional vector; and
   constructing the original M constellation points using said values stored in said unused points of said N dimensional array.

15. The method according to claim 9 wherein the step of modifying the value of the displacement vector (B) includes the steps of:
- clipping the inverse fourier transform (IFT) of the sum (N+B) to provide a result;
- performing a fourier transform on the result; and
- storing any the amplitude and position of any clipped signals.

16. The method according to claim 11 wherein said N complex points define and N dimensional array and further comprising the step of performing an indication function on points within said N dimensional array, said indication comprising the steps of:
- multiplying unused points within said N dimensional array by one on an element by element basis: and
- multiplying used points within said N dimensional array by zero on an element by element basis.

17. A method of minimizing the loss of data due to signal clipping in a discrete multi-tone (DMT) communications system having a dynamic range by transmitting signals within a predefined transmission subspace, the transmission subspace confined within the dynamic range, the method comprising the steps of:
- mapping a data point to a specific point within a first subspace (Sx);
- choosing an offset point from a subspace (Sb) that is orthogonal to said first subspace; and
- adding the vector equivalent B of said offset point to the vector equivalent X of said specific point within said first subspace (Sx) to obtain a vector sum (X+B) within said transmission subspace.

18. The method according to claim 17 wherein said mapping step is performed one-to-one to points in said first subspace (Sx).

19. The method according to claim 17 wherein said step of choosing an offset point is performed by the steps of:
- making an initial guess for the vector sum (X+B);
- transforming the vector sum (X+B) to a time domain equivalent signal; and
- clipping the time domain equivalent signal.

20. The method according to claim 17 further comprising the steps of:
- determining if the time domain equivalent signal has changed; and
- transmitting the time domain equivalent signal if it has not changed.

21. The method according to claim 17 further comprising the steps of:
- determining if the time domain equivalent signal has changed; and
- performing a reverse transformation of said time domain equivalent signal if it has changed; and
- projecting the vector sum (X+B) unto the transmission subspace.

22. The method according to claim 17 wherein said initial guess is performed by setting the offset point to zero.

23. The method according to claim 17 wherein said initial guess is performed by setting the offset point to any non-zero constant.

24. A method of controlling signal clipping and distortion in a Discrete Multi-Tone (DMT) communications system that transmits points in an N dimensional transmission space wherein clipping and distortion occurs when the N dimensional transmission moves outside a predefined transmission subspace, the method comprising the steps of:
- converting a group of data bits to be transmitted to a block of real value N points, the real value N points being constrained to lie in a signal subspace of said predefined transmission space;
- analyzing said block of real value N points to determine if they would be clipped or distorted when transmitted.

25. The method according to claim 24 wherein said mapping step is performed by adding a displacement vector to said block of real value N points if said real value N points would be clipped or distorted, said displacement being in an orthogonal subspace to said signal subspace.

26. The method according to claim 24 wherein said displacement is computed using an iterative process that converges to a point of overlap between said orthogonal subspace and said predefined transmission subspace.

* * * * *